United States Patent
Chang et al.

(10) Patent No.: US 8,367,179 B2
(45) Date of Patent: Feb. 5, 2013

(54) RECORDABLE OPTICAL RECORDING MEDIA

(75) Inventors: Han-Feng Chang, Luzhu Township, Taoyuan County (TW); Yuh-Rur Kuo, Longtan Township, Taoyuan County (TW); Yung-Hui Hung, Linkou Township, Taipei County (TW); Su-Hsuan Chang, Taoyuan (TW)

(73) Assignee: CMC Magnetics Corporation, Taipei (TW)

( * ) Notice: Subject to any disclaimer, the term of this patent is extended or adjusted under 35 U.S.C. 154(b) by 222 days.

(21) Appl. No.: 12/714,882

(22) Filed: Mar. 1, 2010

(65) Prior Publication Data
US 2010/0279054 A1    Nov. 4, 2010

(30) Foreign Application Priority Data
Apr. 29, 2009  (TW) .............................. 98114158 A

(51) Int. Cl.
*B32B 3/02* (2006.01)
(52) U.S. Cl. .................. 428/64.1; 428/64.4; 430/270.12
(58) Field of Classification Search ................. 428/64.4; 430/270.12
See application file for complete search history.

(56) References Cited

U.S. PATENT DOCUMENTS
7,276,274 B2 * 10/2007 Inoue et al. .................. 428/64.4
* cited by examiner

*Primary Examiner* — Elizabeth Mulvaney
(74) *Attorney, Agent, or Firm* — C. G. Mersereau; Nikolai & Mersereau, P.A.

(57) ABSTRACT

A recordable optical recording media is provided with an inorganic recording layer prepared by magnetic sputtering. The recording layer is a combination film including a primary component selected from cupper (Cu), silicon (Si), chromium (Cr) or the combination thereof. The purpose of recording data can be achieved by way of altering micro-structure of the recording layer after irradiating the recordable optical recording media by a laser beam.

4 Claims, 2 Drawing Sheets

RECORDABLE OPTICAL RECORDING MEDIA

FIELD OF THE INVENTION

The present invention relates to an optical recording media, and more particularly to an inorganic recording layer of a recordable optical recording media.

BACKGROUND OF THE INVENTION

Optical recording storage involves laser technique to record data in an optical recoding media. Currently, organic dyes are typically utilized to form a recording layer on optical recording discs. After the implementation of burning process on an optical recording disc, the organic dye of the recording layer would be degradation or deformation due to irradiating light beam on the disc by a laser having a constant burning power. The procedure will cause reflective index difference between the burned region and the non-burned region. Consequently, data stored in the optical disc could be read by a laser with an appropriate power by utilizing the difference of reflective indexes.

Because the range of the light wavelength absorbed by the organic dyes is narrow, only few specific organic dyes can be used at a specific wavelength range. According to current blue-ray recordable media, the wavelength of a laser light is short (405 nm). Therefore, the potential organic dyes species utilized in the blue-ray recordable media are few. Furthermore, it is because that the gauges of the substrate guiding track of the blue-ray recordable media are narrow, thus the organic dye is unlikely to be coated on the substrate uniformly. Therefore, in recent years, some researches announce to replace the organic dyes by inorganic materials, such as conductor (metal) or semiconductor, to form the recording layer of the recordable discs.

SUMMARY OF THE INVENTION

In order to overcome the drawbacks that organic dyes can be utilized within a narrow laser light wavelength range only, and only few specific organic dyes can be used according to the specific wavelength range of laser light, the present invention provides an inorganic recordable optical recording media having high stability and high light absorption rate at wavelength regions of visible rays. The interface morphology or micro-structure of films on the inorganic recordable optical recording media would be changed by heating through laser pulse with various wavelengths, thereby altering the reflective index of the films.

An object of the present invention is to introduce a single film of inorganic material for forming a recording layer of a recordable optical recording media. A recording region of conductor (metal) or semiconductor films is irradiated by laser, followed by altering the structure of the interface of the recording region to achieve the reflective index change at the recording region for recording digital signal on the recordable optical recording media.

In order to reach the above-mentioned object, the present invention provides a recordable optical recording media. Data reading or writing can be performed by irradiating laser light to an opposite side (rear side) of the recordable optical recording media substrate. In other embodiments, data can be read or wrote by irradiating laser light from the front side of the recordable optical recording media as well. The architecture of the coated films on the substrate as shown in FIG. 1, and it refers to a structure of a recordable optical recording media. The structure comprises a reflective layer, a first buffer layer, a recording layer, a second buffer layer, a compensation layer, and a light transmission layer. The layers are constructed on the substrate which includes the reflective layer formed thereon. The first buffer layer is formed on the reflective layer, subsequently, the recording layer is formed on the first buffer layer, followed by forming the second buffer layer on the recording layer, and the compensation layer and the light transmission layer which acts the upmost layer are successively formed on the second buffer layer. The light transmission layer of the recordable optical recording media is irradiated by laser light for reading and writing data. As shown in FIG. 1, after irradiating on a local region by a laser light, the micro-structure of the local region of the single recording layer is changed by absorbing the laser light. A mixing region caused by the diffusion of the interface elements with one another is generated. It is because that the film structure is different, consequently, there is apparent reflective indexes difference between the mixing region heated by laser and the non-mixing region without heating by laser. The reflective indexes difference phenomena can be utilized to record data on the recordable optical recording media.

A detailed description is given in the following embodiments and references to the accompanying drawings and claims.

DETAILED DESCRIPTION OF THE PREFERRED EMBODIMENT

The invention hereinafter will be described in greater detail with preferred embodiments of the invention and accompanying illustrations. Nevertheless, it should be recognized that the preferred embodiments of the invention are not provided to limit the invention but to illustrate it. The present invention can be practiced not only in the preferred embodiments herein mentioned, but also in a wide range of other embodiments besides those explicitly described. Further, the scope of the present invention is expressly not limited to any particular embodiments except what is specified in the appended claims.

The present invention discloses a recordable optical recording media having a single recording layer for recording data. In embodiments of the present invention, laser light with wavelength range of visible ray is utilized to write data with high rate and stability into the recordable optical recording media, and the data can be stored in the recordable optical recording media for a long duration. It should be noted that the scope of the present invention is expressly not limited to any particular embodiments specified in the present invention.

Figure 1:
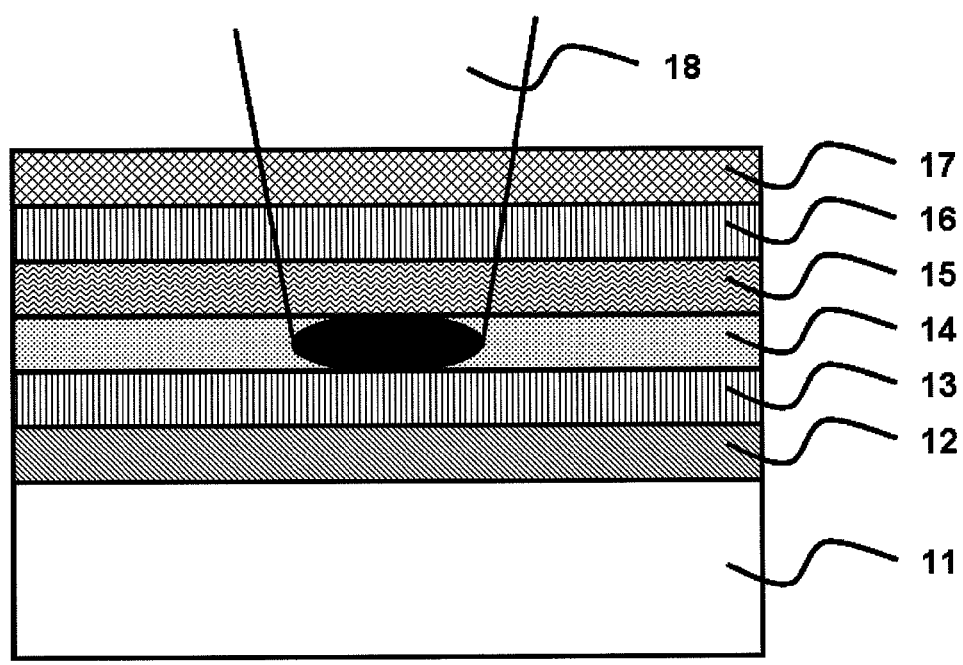
FIG. 1 is a diagram of a layers structure of a recordable optical recording media according to the present invention.

The structure of a recordable optical recording media of an embodiment of the present invention is shown as FIG. 1. The structure comprises a substrate 11, a reflective layer 12, a first buffer layer 13, a recording layer 14, a second buffer layer 15, a compensation layer 16 and a light transmission layer 17. The reflective layer 12 is formed on the substrate 11. The first buffer layer 13 is successively formed on the reflective layer 12, the recording layer 14 is continuously formed on the first buffer layer 13, the second buffer layer 15 is next formed on the recording layer 14. Subsequently, the compensation layer 16 is formed on the second buffer layer 15, and the light transmission layer 17 is formed on the compensation layer 16 to act the upmost layer. Under the recordable optical recording media with this novel structure, the data can be wrote and read by irradiating a laser light on the light transmission layer 17.

In certain embodiments of the present invention, material of the substrate is selected from transparent materials which have appropriate mechanical strength for the recordable optical recording media. The candidate materials for the substrate comprise polycarbonate resin, polymethyl methacrylate, polystyrene resin, polyethylene resin, polypropylene resin, and so on. Moreover, the substrate has a spiral continuous structure which is constructed by grooves and lands. When data stored on the recordable optical recording media are recorded or read, these grooves and lands are utilized to act the laser beam guiding track and the area for recording information.

In preferred embodiments of the present invention, material of the reflective layer is selected from elements such as gold (Au), silver (Ag), molybdenum (Mo), aluminum (Al), titanium (Ti), tantalum (Ta), neodymium (Nd), bismuth (Bi), or an alloy in combination thereof The thickness of the reflective layer is between 5 nm to 300 nm.

In certain embodiments of the present invention, materials of the first buffer layer 13 and the second buffer layer 15 are composed of dielectric materials selected from zinc sulfide-silica ($ZnS—SiO_2$), silicon nitride (SiN), germanium nitride (GeN), or silicon carbide (SiC). The thickness of the first buffer layer 13 and the second buffer layer 15 are respectively between 1 nm to 300 nm, and the first buffer layer 13 and the second buffer layer 15 can be consisted by single layer or combination by more than one of above-mentioned materials.

In certain embodiments of the present invention, a target material for forming the recording layer 14 includes some components selected from copper (Cu), silicon (Si) and chromium (Cr). The thickness of the recording layer 14 is between 3 nm to 50 nm.

In perferred embodiments of the present invention, material of the compensation layer 16 includes silicon oxynitride (SiON). The thickness of the compensation layer 16 is between 3 nm to 50 nm.

In certain embodiments of the present invention, material of the light transmission layer 17 is photo-curing resin for protecting and assuring the stability of the recordable optical recording media, and preventing the materials of the films from being abrade, metamorphic by wet, or oxidation in atmosphere.

The preferred embodiment of the present invention is descried as follow:

A substrate of a blue-ray disc with carved grooves and lands is prepared. The track gauge of the substrate is about 74 μm, and the depth of the track is around 1.1 mm. A reflective layer 12 is formed on the substrate 11 by magnetron sputtering. The material of the reflective layer 12 is silver (Ag) and the thickness of the reflective layer 12 is 80 nm. Subsequently, a first buffer layer 13 is formed on the reflective layer 12. The material of the first buffer layer 13 is zinc sulfide-silica ($ZnS—SiO_2$) and the thickness of the first buffer layer 13 is 20 nm. Moreover, a recording layer 14 is formed on the first buffer layer 13. The recording layer 14 is a combination layer formed from copper (Cu), silicon (Si) and chromium (Cr), and the thickness of the recording layer 14 is 14 nm. Then, a second buffer layer 15 is formed over the recording layer 14. The material of the second buffer layer 15 is zinc sulfide-silica ($ZnS—SiO_2$) and the thickness of the second buffer layer 15 is 20 nm. A compensation layer 16 is subsequently formed over the second buffer layer 15. The material of the compensation layer 16 is silicon oxynitride (SiON) and the thickness of the compensation layer 16 is 15 nm. Finally, a light transmission film is attached over the compensation layer 16 to be employed as a light transmission layer 17 of the blue-ray disc. The embodiment of the present invention is completed and the structure is shown as FIG. 1.

The thickness of the film is measured by atomic force microscope (AFM) and ETA Optik. The dynamic analysis of the disc is tested by Pulstec ODU-1000 dynamic testing instrument for measuring the dynamic property of the disc. During the testing, the writing power is between 3 mW to 20 mW, the wavelength of a laser is around 405 nm ($\lambda=405$ nm), and the numerical aperture (NA) is about 0.85. The writing rates are respectively around 4.92 m/s, 9.84 m/s, 19.68 m/s, and 29.52 m/s and these rates fulfill the requirements of 1×, 2×, 4×, and 6× rates demanded by the blue-ray disc specification, respectively.

Figure 2:
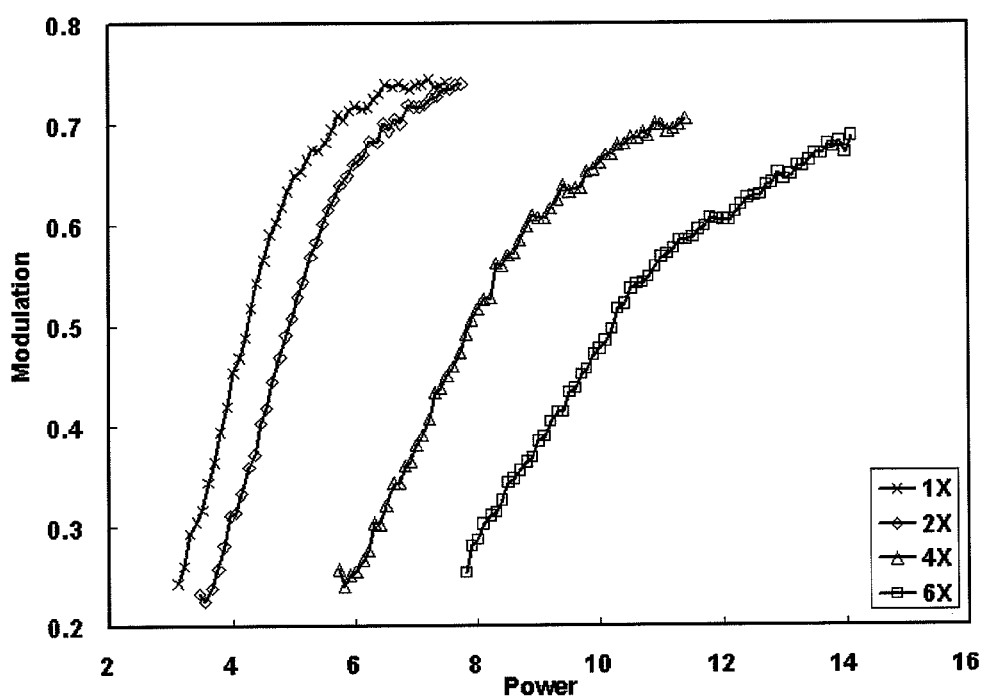
FIG. 2 is a diagram of dynamic testing results of writing power and modulation of the recordable optical recording media according to the present invention.
Figure 3:
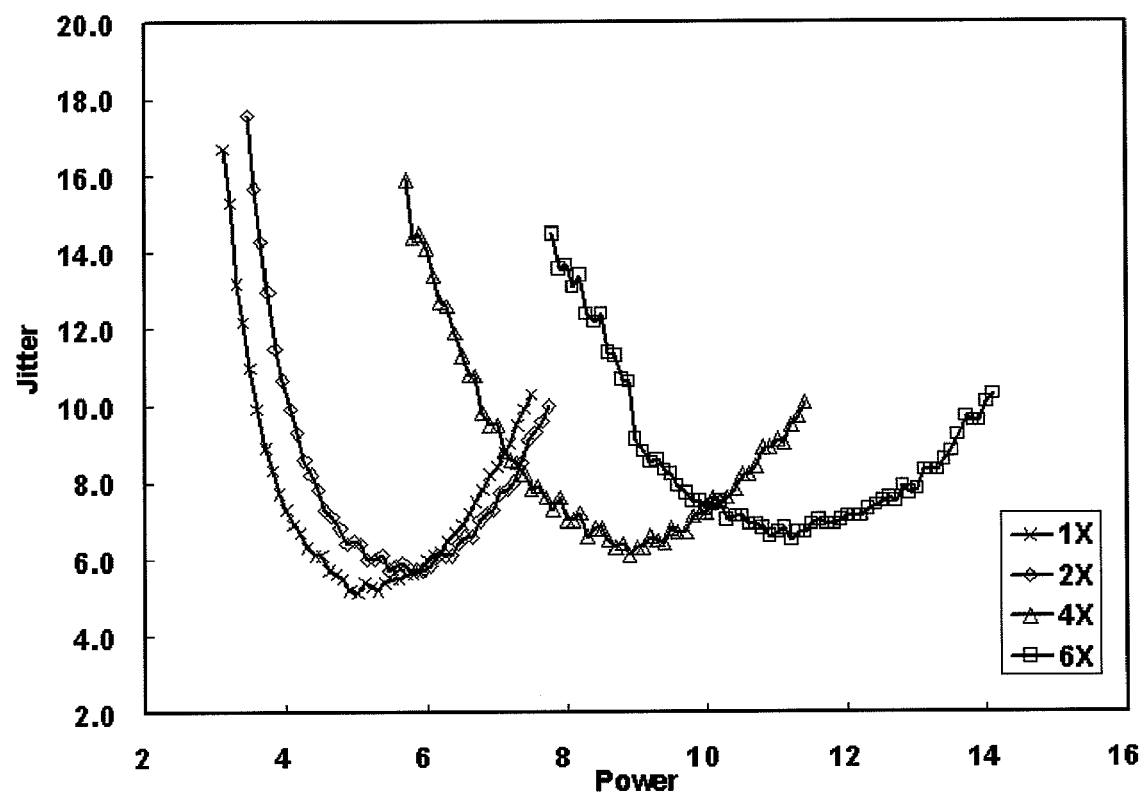
FIG. 3 is a diagram of dynamic testing results of writing power and jitter of the recordable optical recording media according to the present invention.

Regarding to FIG. 2, it shows a diagram of the dynamic testing results according to writing power and modulation of the disc of the embodiment. As shown in FIG. 2, the modulation of the blue-ray disc is increased according to the writing power raised with different recording rates, for instance, 1×, 2×, 4×, and 6× rates. The values of modulation are about more than 0.6 under different writing rates and writing powers, and it meets the requirement of the blue-ray disc (the standard value of modulation is more than 0.4).

When the recording rate of the blue-ray disc is 1×, the jitter value of the blue-ray disc only can be measured as the writing power more than 3.1 mW. The jitter value is reduction along with the writing power is raised. When the writing power is 5.0 mW, the lower jitter about 5.1% can be obtained. With the continuous increase of the writing power, the jitter value will increase as well. In 2× writing rate for testing, the trend is the same as above-mentioned. The jitter value can be measured only when the writing power is more than 3.45 mW. Similarly, the jitter value is reduction when the writing power is increased. As the writing power is 5.55 mW, the lower jitter value about 5.4% can be measured. With the writing power continuously increases, the jitter value increased as well. In 4× rates of writing rate for testing, the trend is still maintained. The jitter value can be measured only when the writing power is more than 5.7 mw. The jitter value will be reduced when the writing power is increased. As the writing power is 8.9 mW, the lower jitter value about 6.1% can be measured. Aforementioned, the jitter value is increased along with the writing power keeps increasing. In 6× rate of writing rate for testing, the trend is not changed as well. The jitter value can be measured only when the writing power is increased to more than 7.8 mW. The jitter value will reduce when the writing power increased. During the writing power is around 11.2 mW, the lower jitter value about 6.5% is measured. Along with the increasing writing power, the jitter value increases. When signals are written by the laser, the temperature of the recording layer will be raised by heating due to the irradiation of the laser pulse. If the writing power is too low, the temperature of the recording layer is corresponding low as well. Consequently, the reflective index of the film will not be changed, and the jitter value and the modulation can't be measured. Otherwise, when the writing power is too high, the jitter value will be increased along with the increasing writing power. The reason caused the phenomena is that the power of the laser is high enough to raise the temperature of the recording layer thereby transforming the structure character of the layers within the disc. That is why the jitter value increases. Therefore, the writing power of the disc should be controlled within an appropriate range. In this embodiment, the writing rate of the blue-ray disc is 1×-4× for writing data, and the writing power is about 311.5 mW. The appropriate writing power to write data is required. The jitter values are all controlled below 6.5% for meeting the requirements of the blue-ray disc. Above experiments show that the recordable optical recording media of the present invention is practicable.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A recordable optical recording media comprising a substrate having at least one spiral continuous groove formed thereon, a reflective layer, and a light transmission layer are respectively formed over said substrate, a recording layer and buffer layers are formed between said reflective layer and said light transmission layer; wherein said recording layer is formed by an alloy comprising copper (Cu), silicon (Si) and chromium (Cr); a reflective index of said recording layer being changed after irradiating a laser with a recording wavelength to react said copper (Cu), silicon (Si), and chromium (Cr) to form a composition, thereby forming a recording signal by index change for said recordable optical recording media.

2. The recordable optical recording media according to claim 1, wherein the thickness of said recording layer is between 3 nm to 50 nm.

3. The recordable optical recording media according to claim 1, wherein materials of said buffer layers comprise one of zinc sulfide-silica (ZnS—SiO2), silicon nitride (SiN), germanium nitride (GeN), and silicon carbide (SiC); wherein thickness of said buffer layers are between 1 to 300 nm.

4. The recordable optical recording media according to claim 1, wherein material of said substrate comprises polycarbonate resin, polymethyl methacrylate, polystyrene resin, polyethylene resin, or polypropylene resin.

* * * * *